(12) United States Patent
Gulian

(10) Patent No.: US 12,048,394 B2
(45) Date of Patent: Jul. 30, 2024

(54) GRILL

(71) Applicant: Haig Levon Gulian, London (GB)

(72) Inventor: Haig Levon Gulian, London (GB)

( * ) Notice: Subject to any disclaimer, the term of this patent is extended or adjusted under 35 U.S.C. 154(b) by 937 days.

(21) Appl. No.: 17/022,773

(22) Filed: Sep. 16, 2020

(65) Prior Publication Data

US 2022/0079382 A1    Mar. 17, 2022

(51) Int. Cl.
*A47J 37/07*    (2006.01)
*A47J 37/04*    (2006.01)
(Continued)

(52) U.S. Cl.
CPC ......... *A47J 37/0722* (2013.01); *A47J 37/041* (2013.01); *A47J 37/0704* (2013.01); *A47J 37/0754* (2013.01); *F24C 7/046* (2013.01); *F24C 7/067* (2013.01); *F24C 15/006* (2013.01); *F24C 15/18* (2013.01); *F24C 15/24* (2013.01); *F24C 15/325* (2013.01); *H05B 3/0076* (2013.01)

(58) Field of Classification Search
CPC .... F24C 15/006; F24C 15/007; F24C 15/101; F24C 15/102; F24C 15/12; F24C 15/18; F24C 15/22; F24C 15/24; F24C 15/322; F24C 15/325; F24C 7/00; F24C 7/04; F24C 7/043; F24C 7/046; F24C 7/06; F24C 7/067; A47J 37/041; A47J 37/06; A47J 37/0635; A47J 37/0641; A47J 37/0664; A47J 37/067; A47J 37/0676; A47J 37/0688; A47J 37/0704; A47J 37/0709; A47J 37/0722; A47J 37/0754; A47J 37/0786; H05B 3/0076; H05B 3/68
See application file for complete search history.

(56) References Cited

U.S. PATENT DOCUMENTS 1,954,476 A    4/1934    Gloekler
3,190,283 A    6/1965    Kingo
(Continued)

FOREIGN PATENT DOCUMENTS

EP    1680995 A1    7/2006
EP    2465395 A1    6/2012
(Continued)

OTHER PUBLICATIONS

EP21195175.1, European Search Report dated Feb. 17, 2022, 7 pages.

*Primary Examiner* — Hung D Nguyen
(74) *Attorney, Agent, or Firm* — Andrus Intellectual Property Law, LLP

(57) ABSTRACT

An electric grill configured for cooking food and a method of cooking food using the electric grill includes a housing that defines an open interior and an aperture. Element frames are positioned at the sides of the open interior. Electric heating elements are positioned within the element frames and are positioned within the open interior exterior of the aperture in a direction towards the housing. The electric heating elements generate IR energy that is directed towards a middle of the open interior below the aperture. Heat energy exits the housing through the aperture by radiative heat transfer and convective heat transfer. Such convective heat transfer includes air currents circulating within the open interior past the electric heating elements and out of the aperture.

20 Claims, 6 Drawing Sheets

(51) Int. Cl.
*F24C 7/04* (2021.01)
*F24C 7/06* (2006.01)
*F24C 15/00* (2006.01)
*F24C 15/18* (2006.01)
*F24C 15/24* (2006.01)
*F24C 15/32* (2006.01)
*H05B 3/00* (2006.01)

(56) References Cited

U.S. PATENT DOCUMENTS

| | | | |
|---|---|---|---|
| 3,667,449 | A | 6/1972 | Persinger et al. |
| 3,693,610 | A | 9/1972 | Ehrlichmann |
| 3,757,765 | A | 9/1973 | Yamada |
| 3,938,494 | A | 2/1976 | Clark |
| 3,943,910 | A | 3/1976 | White |
| 4,089,258 | A | 5/1978 | Berger |
| 4,165,683 | A | 8/1979 | Van Gilst |
| 4,541,407 | A | 9/1985 | Sommers et al. |
| 4,553,524 | A | 11/1985 | Wheat et al. |
| 4,593,676 | A | 6/1986 | Wackerman |
| 4,901,705 | A | 2/1990 | Takata et al. |
| 4,905,660 | A | 3/1990 | Leduc et al. |
| 1,944,283 | A | 7/1990 | Tsuchiya et al. |
| 5,421,319 | A | 6/1995 | Moore et al. |
| 5,603,255 | A | 2/1997 | Nouvelot et al. |
| 5,613,486 | A | 3/1997 | Johnston |
| 6,371,011 | B1 | 4/2002 | Kuechler |
| 6,380,519 | B1 | 4/2002 | Wu |
| 6,502,504 | B1 | 1/2003 | Gschwind |
| 7,210,402 | B2 | 5/2007 | Han et al. |
| 10,568,460 | B2 | 2/2020 | Li et al. |
| 2004/0123858 | A1 | 7/2004 | McFadden |
| 2004/0134479 | A1 | 7/2004 | Han et al. |
| 2006/0151471 | A1* | 7/2006 | Jang ............ A47J 37/0709 219/450.1 |
| 2006/0180137 | A1 | 8/2006 | McDonald |
| 2006/0278210 | A1 | 12/2006 | Wang |
| 2008/0314891 | A1 | 12/2008 | Takita |
| 2010/0059038 | A1 | 3/2010 | Ho |
| 2010/0095951 | A1 | 4/2010 | Ahmed |
| 2010/0218691 | A1 | 9/2010 | Adams et al. |
| 2011/0049125 | A1 | 3/2011 | Home |
| 2011/0219957 | A1 | 9/2011 | Fogolin |
| 2012/0064216 | A1 | 3/2012 | Cullen |
| 2012/0160108 | A1 | 6/2012 | Coutts |
| 2012/0247446 | A1 | 10/2012 | Cross |
| 2012/0247447 | A1 | 10/2012 | Cross |
| 2013/0000629 | A1 | 1/2013 | Christopoulos |
| 2017/0065126 | A1 | 3/2017 | To et al. |
| 2019/0246836 | A1 | 8/2019 | Du et al. |
| 2020/0260911 | A1 | 8/2020 | Brennan |
| 2021/0298319 | A1* | 9/2021 | Leibell ............ A23B 4/0523 |

FOREIGN PATENT DOCUMENTS

| | | |
|---|---|---|
| GB | 2286111 | 8/1995 |
| GB | 2373713 | 10/2002 |
| JP | 10-038229 | 2/1998 |
| JP | 2000217718 | 8/2000 |
| JP | 2003033281 | 2/2003 |
| JP | 2003047563 | 2/2003 |
| JP | 2005237465 | 9/2005 |
| WO | 2019120100 A1 | 6/2019 |

* cited by examiner

GRILL

BACKGROUND

The present disclosure relates to an electric grill configured to cook food placed above it.

Grills configured to cook food placed above the heat source are well known. Combustion grills and ovens, including gas combustion devices, are disclosed in for example, GB 2373713; JP10038229; JP 20030 47563; JP 2003 033281; JP 2005 237465; JP 2000 217718; U.S. Pat. Nos. 3,667,449; 9,839,322; and 10,610,052, the disclosures of which are incorporated by reference herein in their entireties.

The food preparation technique of grilling, exposes the food to be cooked to an intense heat during a short period of time. Grilling involves the browning or charring of protein or carbohydrates in the food, in what it called the Maillard reaction, which produces the characteristic flavors of grilling. During this thermal treatment process, localized areas of particularly intense heat transfer results in the searing of the food. Combustion grilling where the heat is produced by burning gas or charcoal is the standard for imparting the culinary effects of grilling. Electric cooking appliances are available, but are limited in ability to produce the heat, heat capacity, and/or longevity of operation temperature while providing a durable device. Commercial food preparation settings may often require a grill to be at an operational temperature for 8-12 hours or longer during a day. The inventor has thus sought to make improvements to electric cooking appliances to produce an electric grill that can meet commercial food preparation demands.

BRIEF DISCLOSURE

The inventor has endeavored to provide an electric grill that provides a similar quality cooking of food, without the combustion of other grills as described above.

An example of an electric grill configured for cooking food includes a housing that defines an open interior and an aperture through the top of the housing. Element frames are positioned at the sides of the open interior The element frames each include upper and lower arms. Electric heating elements are positioned within the element frames. The electric heating elements are positioned within the open interior exterior of the aperture in a direction towards the housing. The electric heating elements generate IR energy that is directed towards a middle of the open interior below the aperture. Heat energy exits the housing through the aperture by radiative heat transfer and convective heat transfer. Such convective heat transfer includes air currents circulating within the open interior past the electric heating elements and out of the aperture.

In additional examples of the electric grill, the electric heating elements and the element frames extend in a vertical direction through a majority of a vertical height of the open interior. The element frames and the electric heating elements may be positioned at an angle between 5-45 degrees past vertical, and further may be positioned at an angle between 15-25 degrees past vertical. The electric grill may further include a grate rod, a grate, a spit, a skewer, or a rotisserie that extends across the aperture. The upper and lower arms of the element frames may each include a series of holes there through and the electric grill may further include cooling ducts extending through the open interior, where the cooling ducts each include a plurality of holes therein along a lengthwise dimension of the cooling ducts, the air currents comprise a convective flow of air from the cooling ducts through the element frames and past the heating elements to heat the flow of air to produce the convective heat transfer. A flow of air flows from the cooling ducts past the heating elements and out of the aperture and the flow of air dissipates heat from the heating elements.

In further examples of the electric grill a tray is located in the open interior. Radiant bodies may be positioned on the tray. The radiant bodies may be positioned within the open interior. The IR energy from the electric heating elements impinges upon the radiant bodies. The radiant bodies reflect a first portion of the IR energy from the electric heating elements through the aperture, the radiant bodies absorb a second portion of the IR energy from the electric heating elements, and the radiant bodies radiate IR energy from the radiant bodies through the aperture. Cooling ducts may extend through the open interior. The cooling ducts may each include a plurality of holes therein along a lengthwise dimension of the cooling ducts. The air currents may include a convective flow of air from the cooling ducts through the element frames and past the heating elements to heat the flow of air, and, once heated, the flow of air exits the open interior through the aperture. The cooling ducts may be respectively positioned below the element frames. A grate shroud may extend from the housing interior of the aperture. The grate shroud may include an angled interior surface that directs the flow air from element frames inward and through the aperture. A blower may be pneumatically connected to the cooling ducts and the blower operates to create a positive pressure of air within the cooling ducts. A frame may be positioned within the open interior, wherein the frame elevates the tray and radiant bodies within the open interior. A drip tray may be movably received within the open interior within the frame and below the tray supporting the radiant bodies. The tray supporting the radiant bodies may include a plurality of spaced apart rods. The electric grill my further include rack support towers that extend upwards from the housing and at least one rack extends between the rack support towers above the aperture.

In an example of a method of cooking food with an electric grill of any of the examples as provided above, the method includes positioning a piece of food on at least one rod above the aperture through the housing. Electrical energization is provided to the electric heating elements such that the electric heating elements generate IR energy. The IR energy is directed from the electric heating elements at the sides of the open interior towards radiant bodies positioned within the open interior. A first portion of the IR energy from the electric heating elements is reflected out of the aperture through the housing. A second portion of the IR energy from the electric heating elements is absorbed in the radiant bodies. IR energy is radiated from the radiant bodies out of the aperture through the housing wherein the IR energy impinges upon the piece of food.

In further examples of the method of cooking food, the electric grill includes cooling ducts that extend within the open interior below the element frames. The cooling ducts each include a plurality of holes therein along a lengthwise dimension of the cooling ducts. The method may further include creating a positive pressure within the cooling ducts with a blower pneumatically connected to the cooling ducts. A flow of air is generated from the plurality of holes in the cooling ducts through the element frames and past the heating elements to heat the flow of air. The flow of air is directed from the element frames inwardly into the open interior and through the aperture with an angled surface of grate shroud that extends from the housing interior of the aperture. The heated flow of air impinges onto the piece of food to thermally treat the piece of food with convective heat transfer. The method may further include that the piece of food is a first piece of food and the electric grill includes rack support towers extending upwards from the housing and at least one rack extends between the rack support towers above the aperture. The method may further include positioning a second piece of food on the at least one rack above the aperture and the first piece of food. The second piece of food may be thermally treated with IR energy and the heated flow of air through the aperture and past the first piece of food.

DETAILED DISCLOSURE

Figure 1:
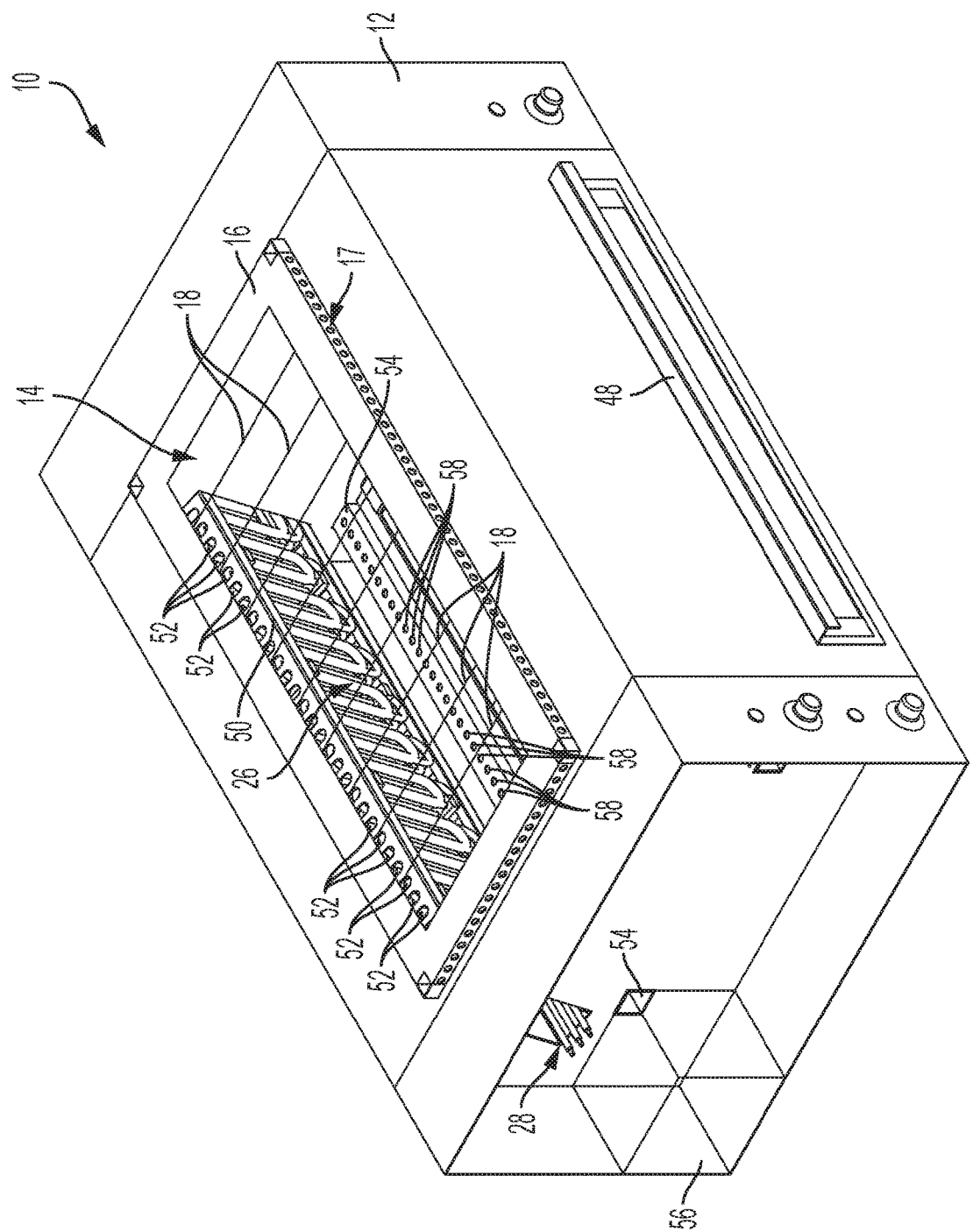
FIG. 1 is a perspective view of a grill.
Figure 2:
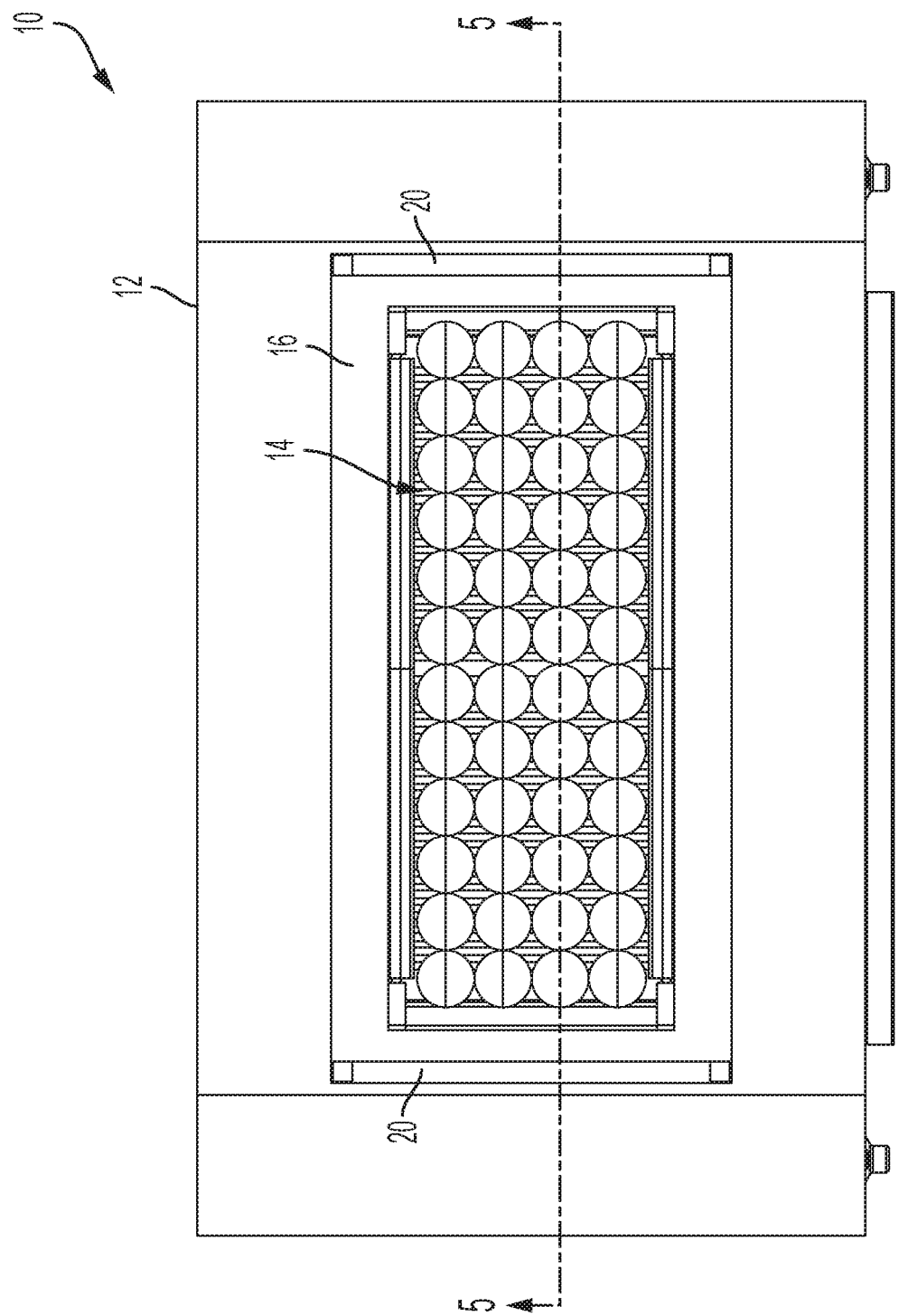
FIG. 2 is a top view of the grill.
Figure 3:
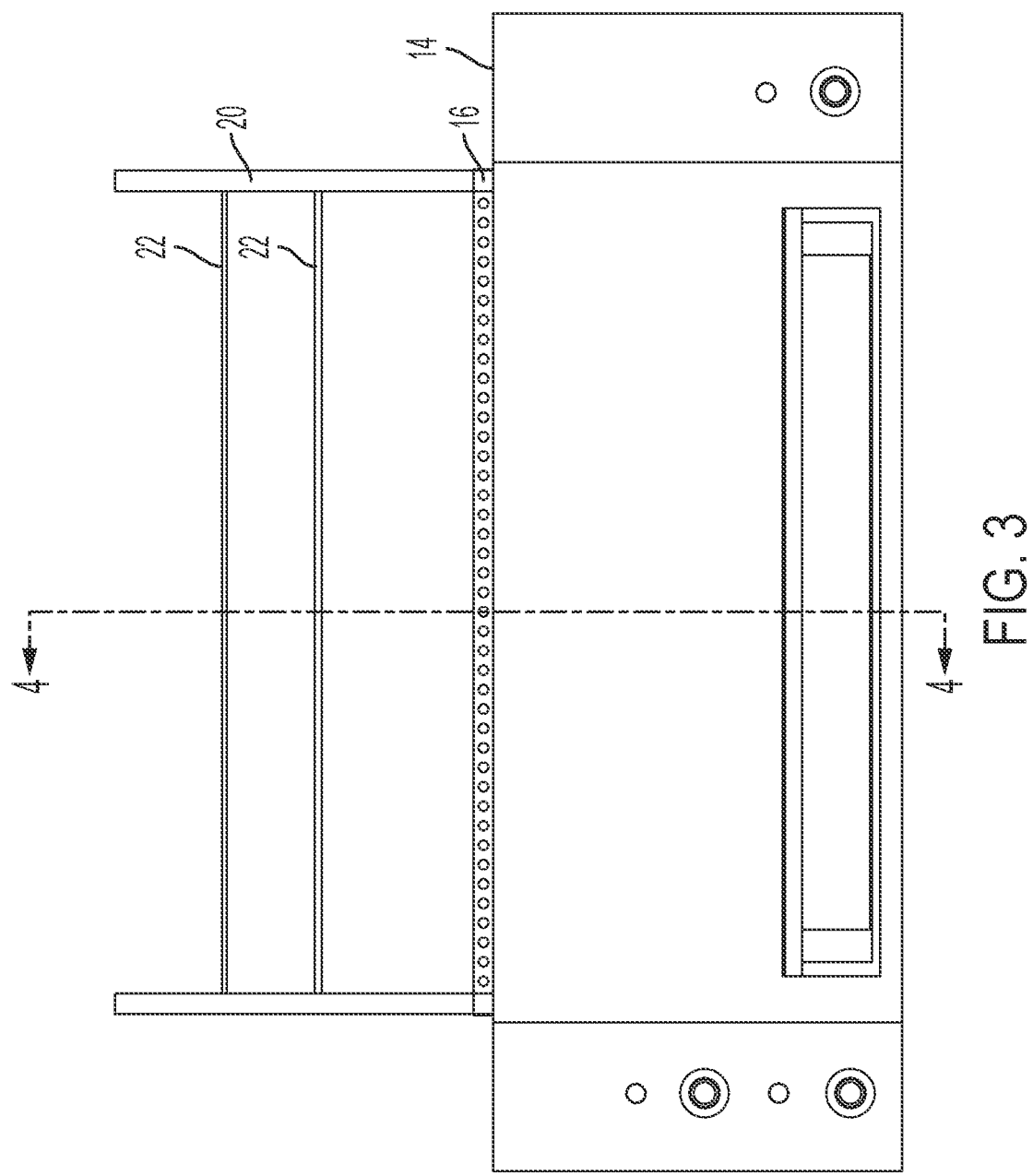
FIG. 3 is a front view of the grill.

FIGS. 1-3 present an example of a grill 10. The grill 10 is an electrified grill that relies upon the electrical generation of heat as opposed to the generation of heat by combustion, which is common in grills for residential and commercial food preparation. While in limited instances, localized combustion may occur, as will be explained in further detail herein, such combustion does not meaningfully contribute to the heat within the grill 10 or the thermal treatment of a food product cooked thereby.

The grill 10 is defined by a housing 12. The housing 12 defines the exterior extent of the functional components of the grill 12. The housing 12 is exemplarily constructed of sheet metal, which may be stainless steel. Specifically, the housing 12 contains the components that generate the heat and direct the heat out of the housing through the grilling aperture 14. The grilling aperture 14 is an opening through the housing 12 through which heat generated by the grill 10 is directed. The grilling aperture 14 is defined by a grate shroud 16. The grate shroud 16 will be explained in further detail herein, but exemplarily extends upward and interior from the housing 12 to define the grilling aperture 14. The grate shroud 16 may include a plurality holes 17, which are open to the interior of the grate shroud 16. In examples that include the plurality of holes 17, the holes 17 may help to dissipate the heat from the grate shroud 16, and contribute to limit thermal transfer from the grate shroud 16 to the housing 12. The grate shroud 16 also is configured to support, a plurality of grate rods 18 that extend across the grilling aperture 14. While a few grate rods 18 are depicted in FIG. 1, it will be recognized that more or fewer may be used with particular arrangements and uses while remaining within the scope of the present disclosure. In an example, the grate rods 18 may be secured to one another to form a single grate, or the grate rods 18 may be connected to the grate shroud 16 individually. In other examples the grate rods 18 may extend across the elongated dimension across the grilling aperture 14. In a still further example, the grate rod 18 may be a single rod, for example in the form of a spit or a rotisserie. As better depicted in, for example, FIG. 3 the grill may further include rack support towers 20 which extend upwardly from the housing 12 and are configured support one or more racks 22 at positions above the grilling aperture 14.

Figure 4:
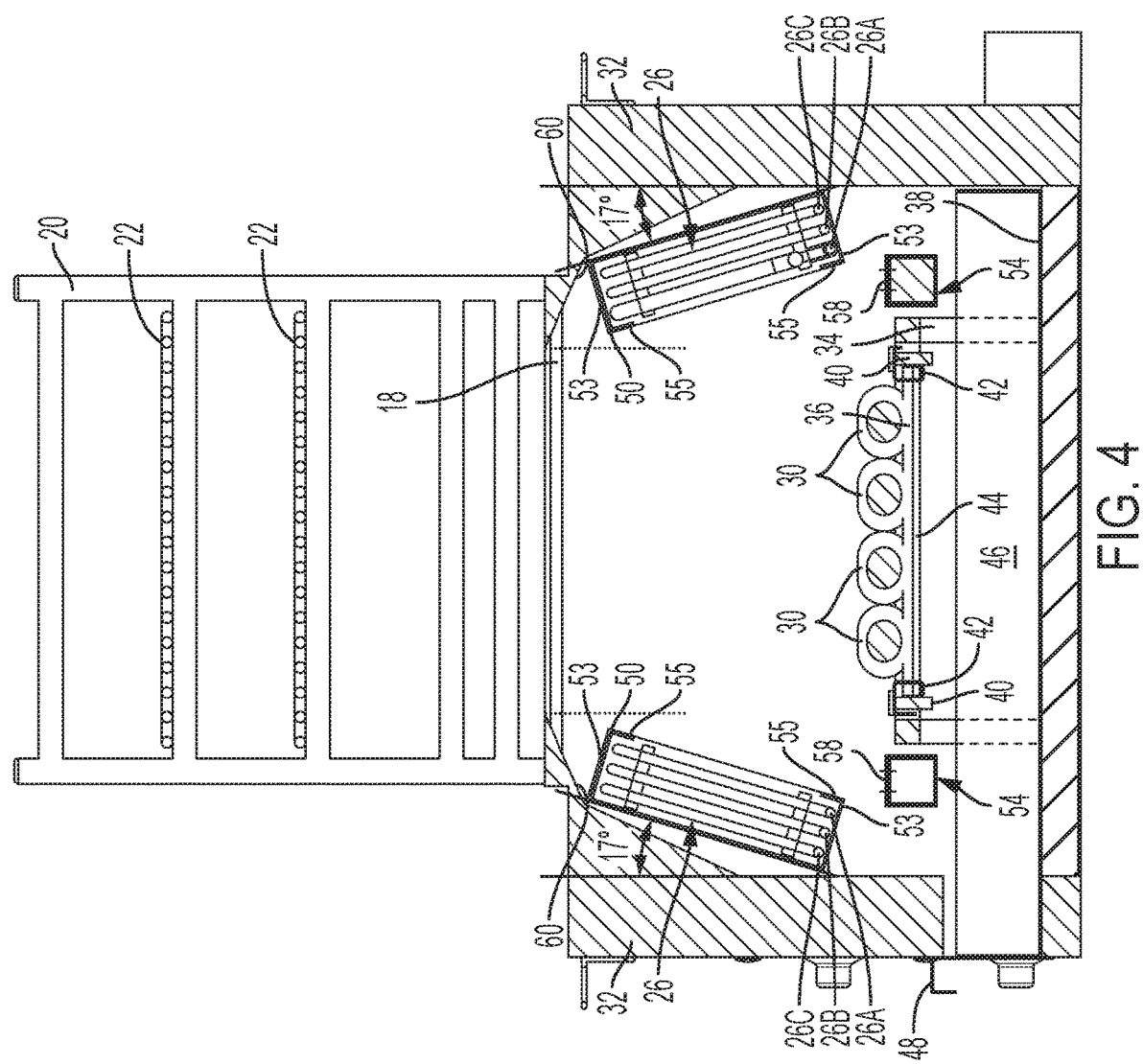
FIG. 4 is a side sectional view of the grill taken along line 4-4 of FIG. 3.
Figure 5:
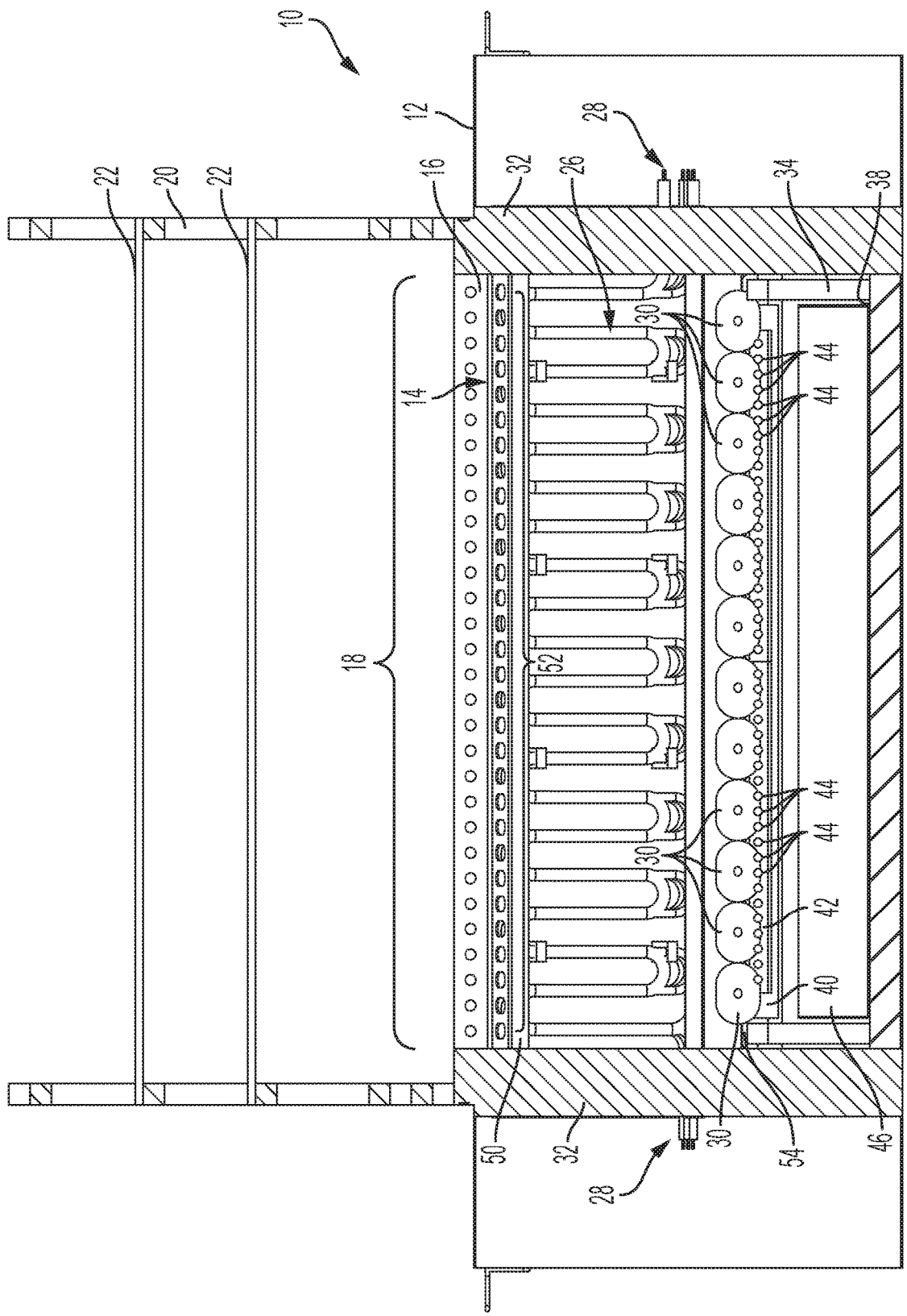
FIG. 5 is a front sectional view of the grill taken along line 5-5 of FIG. 2.

FIGS. 4 and 5 provide sectional views of the grill 10. FIG. 4 is a side sectional view of the grill taken along line 4-4 of FIG. 3 while FIG. 5 is a front sectional view of the grill 10 taken along line 5-5 of FIG. 2. These sectional views better show the interior of the grill 10. The housing 12 defines an open interior 24 of the grill 10. The housing 12 further includes insulation 32 that is positioned between respective interior and exterior walls of the housing 12. The insulation 32 permits the temperature within the open interior to reach temperatures, as explained in further detail below, greater than that of the grilling temperatures at the grilling aperture 14 to cook the food, while maintaining the exterior of the housing 12 at a temperature that poses less burn risk to a user operating the grill 10. In an example, the grill 10 provides temperatures of greater than 400° C., between 400-500° C., or 500° C. or greater at the grilling aperture 14. As will be described in further detail herein, this may require localized temperatures inside the open interior of 600-650° C., or greater. Temperatures of the heating elements or elsewhere within the open interior of the grill in excess of the temperature provided at the aperture 14 are needed to provide the thermal capacity in the grill to maintain the target temperatures at the grilling aperture 14 during extended use and while cooking multiple pieces of food.

Electrical heating elements 26 are positioned within the open interior 24 as described herein. The electrical heating elements are exemplarily serpentine shaped electrical heating elements which may take the form of tubular electric heating elements, for example those known under the name CALROD available from Haier US Appliance Solutions, Inc. Tubular electric heating elements include a resistive wire running internal to a metallic tube with an insulator positioned between the resistive wire and the metallic tube. In examples, this combination may be an effective producer of infra-red (IR) energy for radiative transmission. Electrical heating elements 26 may however take other forms, including, but not limited resistive wires, quartz halogen heaters, and IR diode arrays. Heating elements of the configurations described above, may be configured to reach the temperatures disclosed herein, namely 600-650° C. or greater.

However, the inventor has recognized that operation of electric heating elements at those temperatures make them susceptible to failure or low durability when used in the conditions of a grill. Extended operation of electric heating elements at these temperatures decrease the longevity heating elements. Exposure of the electric heating elements, particularly operating at these temperatures, to grease and debris from the food cooked on the grill create localized hot spots on the electric heating elements which further cause the electric heating elements to degrade. Therefore, an arrangement has been developed to enable the operation of electric heating elements at the operational temperatures of the grill 10 with a durability that makes the grill economical to operate.

As will be explained herein, the grill 10 is configured to make effective use of both radiative heat transfer to the food to be cooked, as well as convective heat transfer. The electrical heating elements 26 may each include a plurality of sub-elements. As exemplarily depicted in FIG. 4, each electrical heating element 26 includes sub-elements 26A, 26B, 26C. As seen in FIG. 1, the electrical heating sub-elements are configured for electrical connection at 28 to a power supply that connects to a source of electrical power, for example electrical mains power of a restaurant facility, through a wall plug (not depicted) of the grill 10. In an example the electric heating elements 26 on either side of the grill may be connected to the power supply in series, while in another example, the electric heating elements 26 are connected to the power supply 28 in parallel to each other. Other electrical arrangements or configurations will be appreciated as being within the scope of the present disclosure based upon this description.

Within the open interior 24 a plurality of radiant bodies 30. These radiant bodies 30 may be lava rocks, ceramic blocks, a bed of particulate mica, or other materials that effectively radiate heat in the direction of the food placed on the grate rods. The radiant bodies 30 may absorb heat energy from the electrical heating elements, which in turn cause the radiant bodies 30 to emit heat radiation. Additionally, the radiant bodies 30 may reflect the heat not absorbed by the radiant bodies 30 in a generally upwards direction towards the food to be cooked.

A frame 34 is positioned within the open interior 24. The frame 34 elevates a tray 36 above the lower surface 38 of the open interior 24. The tray 36 holds the radiant bodies 30 in a position within the open interior 24. The frame 34 supports rails 40 and the tray 36 is suspended from the rails 40 with clips 42 between which a plurality of rods 44 extend, forming the tray 36. The radiant bodies 30 rest on the rods 44 of the tray 36. A drip tray 46 is positioned within the frame 34 and above the lower surface 38. The drip tray 46 is below the tray 36. The frame 34 thus operates to position the tray 36 and the radiant bodies 30 above the drip tray 36 within the open interior 24. As the food cooks it releases liquids in the form of juice, fat, and grease. This drips through the aperture 14 and onto the radiant bodies 30. The radiant bodies 30 are heated to a sufficient temperature to combust at least some of this material as it strikes the radiant bodies 30. However, if there is more liquid than can be combusted by the radiant bodies 30, then the liquid will further drip from the radiant bodies 30 through the tray 36 and into the drip tray 46 for collection. A handle 48 on the exterior of the drip tray 36 as well as the exterior of the housing 12 enables a user to remove and/or reposition the drip tray 36 within the open interior for emptying and cleaning.

The electric heating elements are secured to the sides of the housing 12. As seen in FIG. 4, the electric heating elements 26 are secured within the open interior 24 at a position relative to the side walls that define the open interior 24. The electric heating elements are held in position by an element frame 50. The element frame 50 is mounted such that the electric heating elements are at a downward angle. In an example, the downward angle is between 0 and 45 degrees, between 5 and 45 degrees, or between 5-30 degrees. While in other examples the downward angle is between 0 and 20 degrees, less than 10 degrees, or between 10-20 degrees. In one exemplary embodiment, the electric heating elements are angled downward at 17 degrees. The electric heating elements 26 are elongated in the lengthwise dimension in that the electric heating elements extend for the length of the aperture 14 along a long dimension of the aperture 14. The electric heating elements are also elongated in the vertical dimension in that the electric heating elements extend for substantially the vertical height of the open interior 24. As shown in FIG. 4, the heating element may extend from the top of the open interior to a location even with the radiant bodies 30. In examples, a lower extent of the heating element 26 may terminate above the radiant bodies 30 with the heating element 26 angled to direct the IR energy at the radiant bodies 30. In other examples, the lower extent of the heating element 26 may terminate below the radiant bodies 30 such that the heating element 26 directs at least some IR energy towards the tray and/or below the radiant bodies 30. In further examples, the heating elements 26 may extend in the vertical dimension greater than half the distance across the aperture 14, or similarly greater than half the distance between the heating elements 26. The height of the heating elements 26 combined with the angle thereof, enables the heating element 26 to direct IR energy across the full width of the tray 36 of radiant bodies 30. In still further examples, the heating elements 26 may extend the same distance in the vertical dimension as the distance across the aperture 14 or between the electric heating elements 26. The extent of the heating elements 26 therefore may be independent of the position of the radiant bodies 30 or independent of the use of one or more radiant bodies within the grill 10.

The element frames 50 within which the heating elements 26 are held may be generally c-shaped with upper and lower arms 53 that extend over the respective top and bottom of the heating elements 26. Examples of the element frames 50 include holes 52 in these arms 53, which as described in further detail herein, help to direct airflow within the open interior 24 of the grill 10. Cooling ducts 54 are positioned below the heating elements 26 and the element frames 50. The cooling ducts 54 are hollow and have a series of holes 58 in the top of the cooling ducts 54 that extend for the length of the cooling ducts 54. The cooling ducts 54 are connected to a blower 56. In an example, both cooling ducts 54 are connected to a single blower 56, while in other examples, multiple blowers may be used. As used herein, blower is understood to be any device that creates a positive displacement of air into the cooling ducts 54, resulting in the air being expelled from the cooling ducts 54 through the holes 58.

The cooling ducts 54 are positioned laterally adjacent to the tray 36 containing the radiant bodies 30 and in close proximity to the heating elements 26 and element frames 50. Therefore, during operation, portions of the cooling ducts 54 will heat up due to conduction and radiation from the components within the open interior 24. As the air from the blower 56 passes through the cooling ducts 54, the air will begin to be heated. The pre-heated air exiting the holes 58 in the cooling ducts 54 is directed through and around the element frames 50 and heating elements 26. This dissipates the heat from heating elements 26 into the air to a temperature that promotes longevity and operational performance of the heating elements 26. Additionally, the dissipated heat from the heating elements 26 heats the air moving past the heating elements 26 creating a convective heat flow with the moving air that circulates through the open interior 24 of the grill 10 and exits through the aperture 14. The heated air exits through the holes 52 in the element frame 50 are is directed by an interior surface 60, exemplarily of the grate shroud 16 to exit the open interior 24 through the aperture 14. The grate shroud 16, exemplarily has an angled interior surface 60 that directs the flow of air away from the element frames 50 and into the aperture 14.

While the cooling ducts 54 are depicted and described above as being adjacent to the tray 36, with holes 58 directed upwards, it will be recognized that the cooling ducts 54 and holes 58 may have other positions and/or orientations. The cooling ducts may extend below the tray 36 and/or radiant bodies 30. The cooling ducts 54 may include holes 58 at one or more orientations, for example to direct air through the radiant bodies 30, or to direct the air at an angle or horizontally towards the electric heating elements 26 and/or towards the walls of the open interior 24. It will be recognized that in other embodiments, the arms 53 of the element frames 50 may not include holes 52 as described above, instead providing a solid piece of material. In such examples, the arms 53 may or may not include the lips 55 as depicted in FIG. 4.

The grate shroud 16 is exemplarily positioned above the respective heating elements 26 and element frames 50. This limits the aperture 14 and the exposed portion of the grate 18 to portions that are directly above the radiant bodies 30, and inward from the heating elements 26 and element frames 50. This maximizes the radiant energy that is received at any location on the grate as there are no obstructions between the radiant bodies 30 and the grate, but also helps to prevent fouling of the heating elements 26 by fat, grease, or debris falling into the open interior 24 from the food being cooked on the grate 18. Additionally, the flow of air through and/or past the heating elements 26 created by the cooling ducts 54 helps to form a curtain of moving air that further protects the heating elements from debris. Debris on the heating elements can create localized hot spots on the element itself as the debris is burned, which can reduce performance and lifespan of the heating element.

Figure 6:
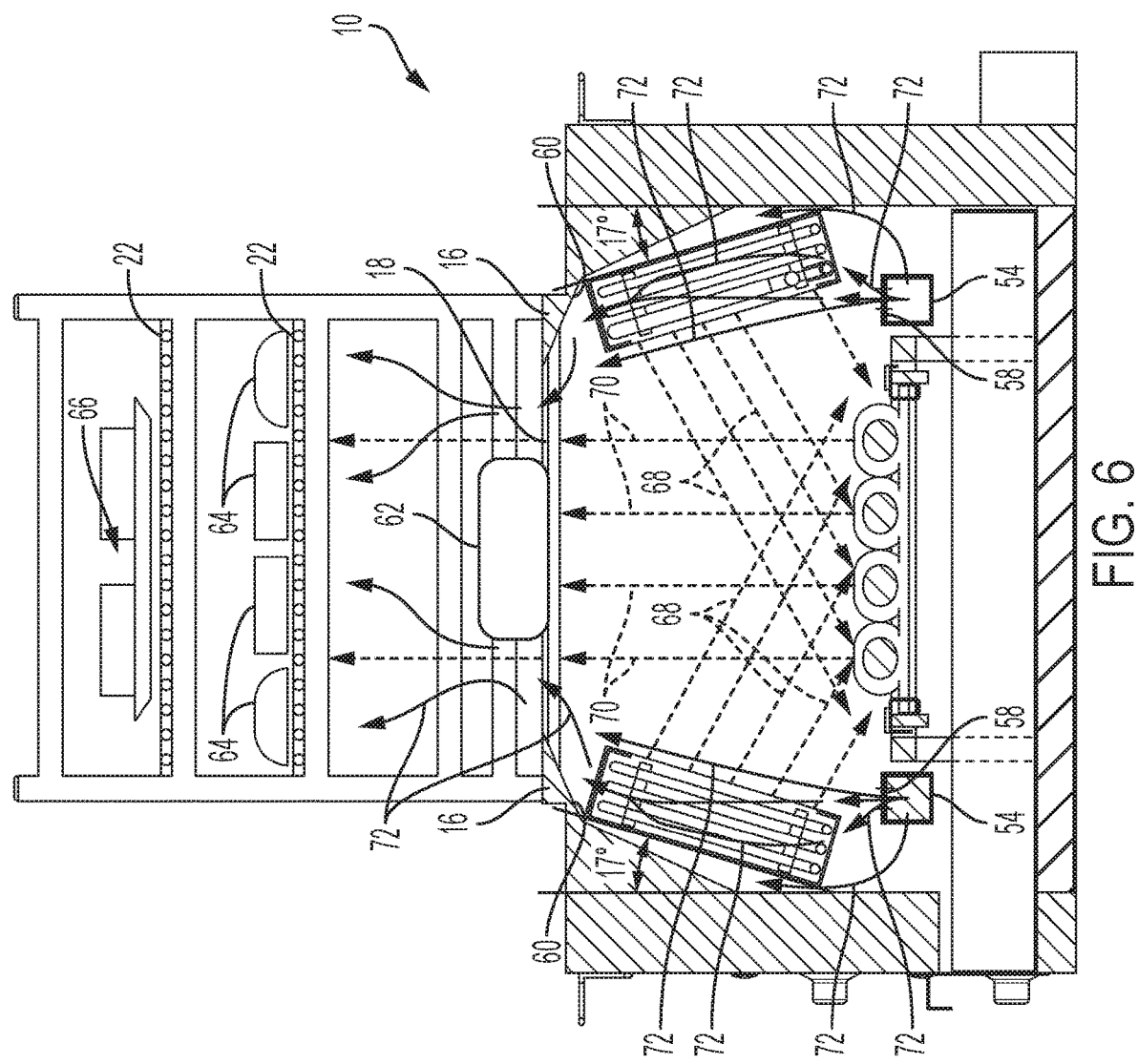
FIG. 6 is the sectional view of the grill of FIG. 4, with diagrammatic representations of the heat transfer within the grill.

FIG. 6 is the same sectional view of the grill 10 as presented in FIG. 4, but with diagrammatic representations of the heat transfer within the grill 10. In FIG. 6 a piece of food 62, exemplarily a piece of protein to be cooked such as a piece of chicken or steak is placed on the grate 18 within the aperture 14. It is also to be noted that other foods are placed on the racks 22 supported by the rack tower 20 above the aperture 14. As examples, buns or bun halves 64 are placed on one rack 22 for toasting, while a tray of already cooked food 66 is placed on another rack 22 to keep warm before serving. Other foods may be similarly placed on the additional racks 22 for example to cook foods at different temperatures simultaneously using the same grill operating under a set operational condition.

Dashed lines represent radiant (IR) heat energy transfer within the grill 10. IR energy 68 radiated from the heating elements 26 is directed generally in the direction of the radiant bodies 30. It will be understood that while the dashed lines are shown as straight, radiated IR energy is emitted in all directions, but the dashed lines represent the general direction of the IR energy for the purposes of the disclosure. Material shape and selection can help to direct the effective direction of the IR energy. For example, material shape and selection of the element frames 50 may facilitate directing IR energy in the general directions of arrows 68. The radiant bodies 30 absorb some of the IR energy, and the material of the radiant bodies 30 may be selected for the property of heat absorption. The IR energy 70 is also directed away from the radiant bodies 30 both by reflecting a portion of the IR energy from the heating elements which is not absorbed by the radiant bodies 30, but also by radiating their own IR energy from the heat absorbed from the heating elements 26. In examples, once the radiant bodies 30 have absorbed a sufficient amount of heat, the radiant bodies 30 will also in turn radiate IR energy. In some examples, the radiant bodies 30 may become incandescent, emitting light as well as IR energy. IR energy 70 directed from the radiant bodies 30 (reflected and/or radiated) impinges upon the food 62, thermally treating and cooking the food. Other IR energy 70 from the radiant bodies passes the food 62 and is available to impinge upon the food on the rack 22, thus enabling the toasting of the bun halves 64 depicted thereon.

The solid lines represent convective heat energy transfer within the grill 10. The convective heat transfer is primarily driven by air flow 72 that exits the holes 58 in the cooling ducts 54. This air flow 72 moves past the heating elements 26, heating the air flow 72. As the air flow 72 is heated by the heating elements 26, the air flow 72 continues upward out of the element frame 50. The angled interior surfaces 60 deflect the air flow 72 inwards towards the aperture 14, where the heated air flow 72 impinges upon the food 62, further thermally treating and cooking the food 62 by convective heat transfer. The air flow 72 continues upwards past the food 62 to provide thermal treatment to the food 64 or 66 positioned further up on the racks 22.

As previously noted, the grill operates generally without combustion, although it will be recognized that in some uses of the grill, some combustion may occur, although this combustion is for the purposes of imparting flavor to the food 62 rather than providing a meaningful input of heat energy in to the grilling system. Rather, combustible material for example but not limited to, fat and grease dripping from the food 62 as it cooks, herbs, or aromatic wood chips placed on the radiant bodies 30 combust due to the heat within the grill. The combustion of these materials creates an aromatic smoke which flows upward out of the aperture 14 and impinges upon the food 62 to impart these flavors on the food 62.

While the grill 10 is depicted herein with the rack towers 20 and the racks 22 positioned above the aperture 14, but otherwise open. It will be recognized that further examples may include a full or partial enclosure about a volume above the aperture 14. In such an example, side walls (not depicted extending between and across the rack towers 20, may define side and back walls, while a hinged wall or door may extend across the front to provide an enclosure. A ceiling panel and/or a ventilation hood may be located above the racks 22 and the aperture 14. It will be recognized that these and other enclosures as would be recognized from this disclosure are within the scope of the present disclosure and not limiting on the scope of the presently disclosed grill.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An electric grill for the cooking of food, the electric grill comprising:
   a housing having opposed side walls and defining an open interior and an aperture through a top of the housing;
   a plurality of radiant bodies positioned within the open interior below the aperture;
   element frames positioned at the sides of the open interior, the element frames each comprising upper and lower arms; and
   electric heating elements positioned within the element frames, the electric heating elements positioned within the open interior exterior of the aperture in respective directions towards side walls of the housing, the electric heating elements and element frames angled downwardly and the electric heating elements generate IR energy that is directed towards a middle of the open interior below the aperture at the plurality of radiant bodies such that IR energy from the electric heating elements impinges upon the radiant bodies, and heat energy exits the housing through the aperture by radiative heat transfer and convective heat transfer, wherein such convective heat transfer comprises air currents circulating within the open interior past the electric heating elements and out of the aperture;
   wherein the radiant bodies reflect a first portion of the IR energy from the electric heating elements through the aperture, and the radiant bodies absorb a second portion of the IR energy from the electric heating elements and radiate IR energy from the radiant bodies through the aperture.

2. The electric grill of claim 1, wherein the electric heating elements and the element frames extend in a vertical direction through a majority of a vertical height of the open interior.

3. The electric grill of claim 1, wherein the element frames and the electric heating elements are positioned at a downward angle between 5-45 degrees past vertical.

4. The electric grill of claim 3, wherein the heating elements are positioned at a downward angle between 15-25 degrees past vertical.

5. The electric grill of claim 1, further comprising at least one of a grate rod, a grate, a spit, a skewer, or a rotisserie that extends across the aperture.

6. The electric grill of claim 1, wherein the upper and lower arms each comprise a series of holes therethrough, and further comprising:
   cooling ducts extending through the open interior, the cooling ducts each comprising a plurality of holes therein along a lengthwise dimension of the cooling ducts, wherein a flow of air flows from the cooling ducts past the heating elements and out of the aperture, wherein the flow of air dissipates heat from the heating elements.

7. The electric grill of claim 1, further comprising:
   a tray located in the open interior; and the plurality of radiant bodies are positioned on the tray.

8. The electric grill of claim 1, further comprising cooling ducts extending through the open interior, the cooling ducts each comprising a plurality of holes therein along a lengthwise dimension of the cooling ducts.

9. The electric grill of claim 8, wherein a flow of air flows from the cooling ducts past the heating elements and out of the aperture, wherein the flow of air dissipates heat from the heating elements.

10. The electric grill of claim 9, wherein the cooling ducts are respectively positioned below the element frames.

11. The electric grill of claim 10 further comprising a blower pneumatically connected to the cooling ducts and the blower operates to create a positive pressure of air within the cooling ducts.

12. The electric grill of claim 1, further comprising a frame positioned within the open interior, wherein the frame elevates the tray and radiant bodies within the open interior.

13. The electric grill of claim 12, further comprising a drip tray movably received within the open interior within the frame and below the tray supporting the radiant bodies.

14. The electric grill of claim 13, wherein the tray supporting the radiant bodies comprises a plurality of spaced apart rods.

15. The electric grill of claim 1, further comprising rack support towers extending upwards from the housing and at least one rack extending between the rack support towers above the aperture.

16. A method of cooking food with the electric grill of claim 1, the method comprising:
   positioning a piece of food on at least one rod above the aperture through the housing;
   providing electrical energization to the electric heating elements such that the electric heating elements generate IR energy;
   directing the IR energy from the electric heating elements at the sides of the open interior towards radiant bodies positioned within the open interior;
   reflecting a first portion of the IR energy from the electric heating elements out of the aperture through the housing;
   absorbing a second portion of the IR energy from the electric heating elements in the radiant bodies; and
   radiating IR energy from the radiant bodies out of the aperture through the housing wherein the IR energy impinges upon the piece of food.

17. The method of cooking food of claim 16, wherein electric grill includes cooling ducts that extend within the open interior below the element frames, the cooling ducts each comprising a plurality of holes therein along a lengthwise dimension of the cooling ducts, the method further comprising:
   creating a positive pressure within the cooling ducts with a blower pneumatically connected to the cooling ducts;
   generating a flow of air from the plurality of holes in the cooling ducts through the element frames and past the heating elements to heat the flow of air;
   directing the flow of air from the element frames inwardly into the open interior and through the aperture with an angled surface of grate shroud that extends from the housing interior of the aperture; and
   impinging the heated flow of air onto the piece of food to thermally treat the piece of food with convective heat transfer.

18. The method of cooking food of claim 17, wherein the piece of food is a first piece of food and the electric grill includes rack support towers extending upwards from the housing and at least one rack extending between the rack support towers above the aperture, the method comprising:
   positioning a second piece of food on the at least one rack above the aperture and the first piece of food; and
   thermally treating the second piece of food with IR energy and the heated flow of air through the aperture and past the first piece of food.

19. An electric grill for the cooking of food, the electric grill comprising:
   a housing defining an open interior and an aperture through a top of the housing;

element frames positioned at the sides of the open interior, the element frames each comprising upper and lower arms, wherein the upper and lower arms each comprise a series of holes therethrough; and electric heating elements positioned within the element frames, the electric heating elements positioned within the open interior exterior of the aperture in a direction towards the housing, and the electric heating elements generate IR energy that is directed towards a middle of the open interior below the aperture, and heat energy exits the housing through the aperture by radiative heat transfer and convective heat transfer, wherein such convective heat transfer comprises air currents circulating within the open interior past the electric heating elements and out of the aperture;

cooling ducts extending through the open interior, the cooling ducts each comprising a plurality of holes therein along a lengthwise dimension of the cooling ducts, wherein a flow of air flows from the cooling ducts past the heating elements and out of the aperture, wherein the flow of air dissipates heat from the heating elements.

20. An electric grill for the cooking of food, the electric grill comprising:

a housing defining an open interior and an aperture through a top of the housing;

element frames positioned at the sides of the open interior, the element frames each comprising upper and lower arms; and electric heating elements positioned within the element frames, the electric heating elements positioned within the open interior exterior of the aperture in a direction towards the housing, and the electric heating elements generate IR energy that is directed towards a middle of the open interior below the aperture, and heat energy exits the housing through the aperture by radiative heat transfer and convective heat transfer, wherein such convective heat transfer comprises air currents circulating within the open interior past the electric heating elements and out of the aperture; and a grate shroud that extends from the housing interior of the aperture, wherein the grate shroud includes an angled interior surface that directs the flow air from element frames inward and through the aperture.

* * * * *